INVENTOR.
ALBIN J. NIEMIEC

Sept. 23, 1969     A. J. NIEMIEC     3,468,263

POWER TRANSMISSION

Filed Sept. 27, 1967     3 Sheets-Sheet 2

INVENTOR.
ALBIN J. NIEMIEC

BY

ATTORNEYS

Sept. 23, 1969　　　A. J. NIEMIEC　　　3,468,263
POWER TRANSMISSION

Filed Sept. 27, 1967　　　　　　　　3 Sheets-Sheet 3

INVENTOR.
ALBIN J. NIEMIEC

BY

ATTORNEYS

United States Patent Office 3,468,263
Patented Sept. 23, 1969

3,468,263
POWER TRANSMISSION
Albin J. Niemiec, Warren, Mich., assignor to Sperry Rand Corporation, Troy, Mich., a corporation of Delaware
Filed Sept. 27, 1967, Ser. No. 671,051
Int. Cl. F04b 1/02
U.S. Cl. 103—162     10 Claims

ABSTRACT OF THE DISCLOSURE

A fluid pressure energy translating device having in combination a rotatable cylinder barrel member, a supporting plate member, and a valve plate member disposed between them; a plurality of piston disposed for reciprocation within cylinders in the barrel and cylinder ports communicating each cylinder successively with an inlet and an outlet port in the valve plate, and a bearing ring circumscribing the valve plate and disposed between the cylinder barrel and supporting plate for independent rotary motion relative to the said members.

Background of the invention

This invention relates to power transmissions, particularly to those of the type comprising two or more fluid pressure energy translating devices, one of which may function as a pump and the other as a fluid motor.

The invention is generally concerned with pumps and motors of the axial piston type, and in particular, the invention relates to an improvement in the construction of valve plates as illustrated in the patent to Adolf Keel, No. 2,776,628.

In devices of this type, which comprise a revolving cylinder barrel having a plurality of parallel cylinders therein within which pistons are reciprocated by means of a swash plate device, it is customary to provide a rotary valve mechanism which is operated by the rotation of the cylinder barrel for the purpose of alternately connecting each cylinder bore with the inlet and outlet passages of the device. Many machines of this character utilize a plate valve formed by a flat surface of the cylinder barrel which runs in abutting and in fluid sealing relationship on a stationary flat valve plate. The plate type valve may be so constructed that the cylinder barrel is constantly pressed into engagement with the valve plate so that the clearance at the valve is automatically adjusted to take care of variations in oil viscosity and to compensate for wear. This is a distinct advantage and contributes much to the reliability and long life of devices employing a valve of this character.

In devices of this type operating at extremely high speeds, considerable difficulty has been experienced in the past in attempting to provide satisfactory conditions at the running surfaces between the cylinder barrel and valve plate. At these high operating speeds the increase in the peripheral velocity between the cylinder barrel and valve plate has caused a considerable increase in the temperatures at the bearing surfaces resulting in excessive wear and galling of the surfaces and a corresponding decrease in the performance, reliability, and long life of the device.

Summary of the invention

This invention comprises a bearing ring for use in a fluid pressure energy translating device of the axial piston type having a rotatable cylinder barrel, a supporting plate, and a valve plate disposed between them, wherein a bearing ring circumscribes the valve plate and is designed to cooperate with peripheral bearing surfaces on the cylinder barrel and supporting plate while spinning independently of the same.

It is, therefore, an object of this invention to provide in a rotary fluid pressure energy translating device of the axial piston type, an improved supporting and valve plate construction which is readily adapted to low cost manufacturing.

It is another object of this invention to provide in a rotary pressure energy translating device of the axial piston type, an improved supporting and valve plate construction which will reduce the relative peripheral velocity between the cylinder barrel and supporting plate resulting in a decrease in the temperature build-up between the same.

It is a further object of this invention to provide in a rotary fluid pressure energy translating device an improved supporting and valve plate construction which will reduce excessive surface wear and galling between the cylinder barrel and supporting plate bearing surfaces resulting in greater reliability and long life while operating at extremely high speeds.

Further objects and advantages of the present invention will be apparent from the following description, reference being made to the accompanying drawings wherein a preferred form of the invention is clearly shown.

Figure 1:
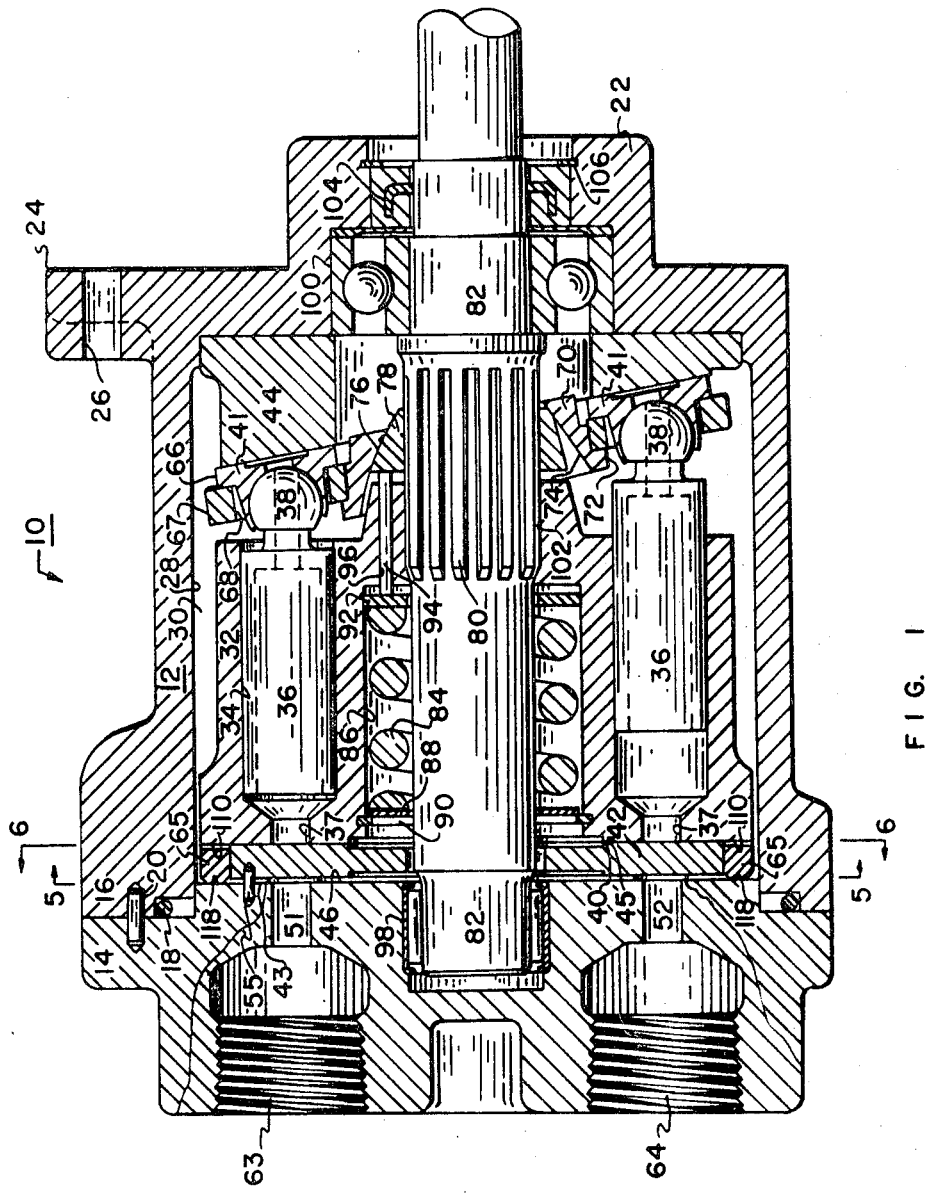
FIG. 1 is a longitudinal transverse section of a fluid pressure energy translating device incorporating a preferred form of the present invention.

Turning now to the figures, and especially FIG. 1, there is shown a pump 10 of the cantilever piston type. The housing 12 of the pump 10 comprises two parts, a supporting plate 14 and a case section 16, secured together by bolts, no shown. An O ring seal 18 insures a fluid tight juncture of the two parts and a dowel pin 20 maintains proper angular alignment between them. Body 12 includes a pilot portion 22 and a mounting flange 24 having mounting holes 26 therein.

A bore 28 in housing 12 provides a chamber 30 having a cylinder barrel 32 positioned therein. Cylinder barrel 32 is provided with a plurality of piston cylinders 34 each having a piston 36 axially slidable therein and cylinder ports 37 for communicating each of the cylinders with the front face 40 of the cylinder barrel. Pistons 36 have spherical ends 38 on which are swaged the socketed shoes 41. The cylinder barrel 32 is positioned axially between a valve plate 42 and the inclined thrust plate 44.

The valve plate 42 is mounted on the righthand face 46 of the supporting plate 14 and has arcuate ports 48 and 49 (FIGS. 5 and 6) which register with the arcuate ports 51 and 52, respectively, in the face 46. The plate 42 may be strengthened by the provision of the bridge portions 53 and 54 which extend across the ports 48 and 49 at their mid-portion. A dowel pin 55 maintains proper angular alignment between the valve plate 42 and the supporting plate 14 and prevents the valve plate 42 from rotating while permitting movement thereof in an axial direction toward and away from the plate 14.

Figure 6:
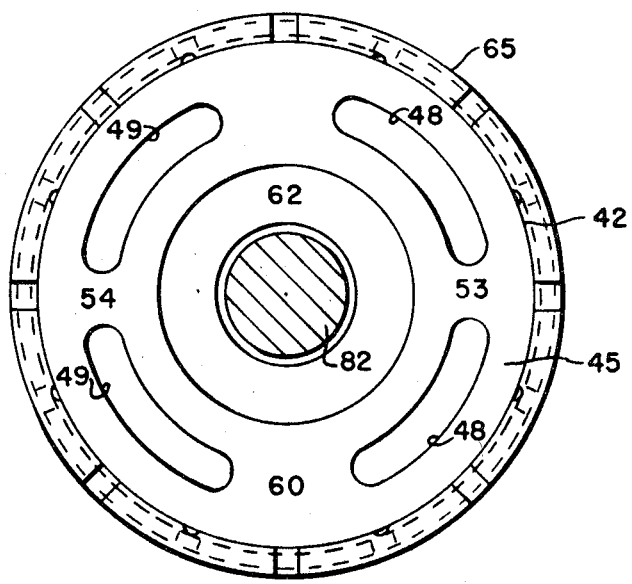
FIG. 6 is a partial sectional view taken on line 6—6 of FIG. 1 illustrating valve plate and bearing member faces.
Figure 5:
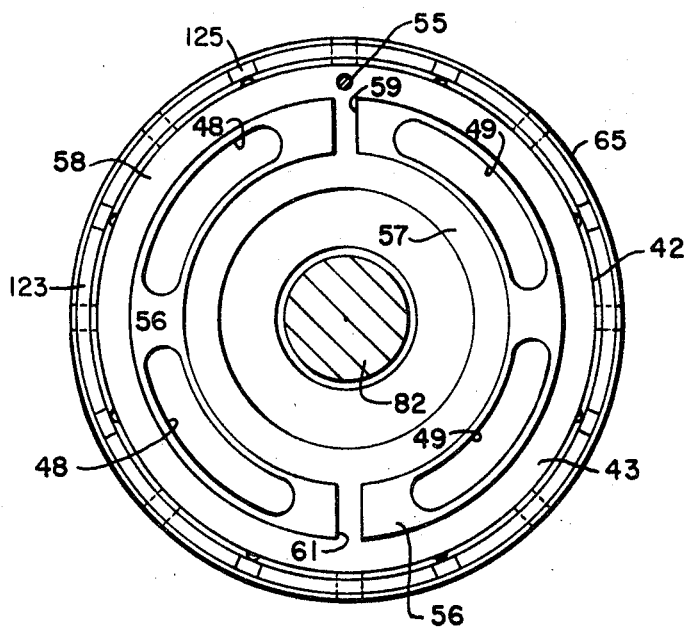
FIG. 5 is a partial sectional view taken on line 5—5 of FIG. 1 illustrating valve plate and bearing member faces.

The construction of the two opposite faces of the valve plate 42 is shown more clearly in FIGS. 5 and 6. FIG. 5 illustrates the lefthand face 43 of the valve plate in FIG. 1, that is, the surface which abuts against the supporting plate 46. It will be seen that this face 43 is provided with an interrupted annular surface 56 in which the two ports 48 and 49 are included. Grooves 57 and 58 are formed inwardly and outwardly of the annular face 56 and are connected together and to the space at the circumference of the plate by radial grooves 59 and 61.

In FIG. 6, the opposite face 45 of valve plate 42 is shown, that is, the righthand face which abuts against the cylinder barrel face 40. It will be seen that this face is formed with a continuous annual surface 60 within which the ports 48 and 49 are included. A groove 62 is formed inwardly of the surface 60.

The valve plate 42 serves in a well-known manner to provide a properly phased connection between the cylinder ports 37 and the valve plate ports 48 and 49. The cylinder ports 37 will communicate successively with the valve plate ports as the cylinder barrel rotates. The valve ports 48 and 49 are connected to external inlet and outlet connection ports of the device, indicated at 63 and 64 by means of the supporting plate ports 51 and 52, respectively.

Around the periphery of valve plate 42 is a bearing member 65 which is also disposed between the cylinder barrel and the supporting plate, the purpose of which will be described hereinfater.

Piston shoes 41 have outwardly extending flanges 66 which are contacted by an annular cage 67 with holes 68 correpsonding to each piston 36. A sleeve 70 is provided with a shoulder 72 to contact cage 66 and has a truncated conical bore 74 therein. Conical bore 74 contacts the spherical outer surface 76 of a collar 78 which is provided with a female spline to engage a male spline 80 in the drive shaft 82.

A spring 84 is positioned in a central recess 86 in cylinder barrel 32. One end of spring 84 acts against a washer 88 and a snap ring 90 in cylinder barrel 32. The other end of spring 84 is exerted against a washer 92 which abuts a plurality of push rods 94 extending axially through hole 96 in cylinder barrel 32 into engagement with collar 78. Force exerted by spring 84 thus brings the face 40 of cylinder barrel 32 into engagement with the valve plate 42 and also biases the shoes 41 into engagement with the thrust plate 44.

The drive shaft 82 is supported between bearing 98 and 100 and is effective to transmit torque from a prime mover, not shown, to the cylinder barrel through a driving connection at 102. A conventional shaft seal is provided at 104 and is retained in position by snap ring 106.

Figure 3:
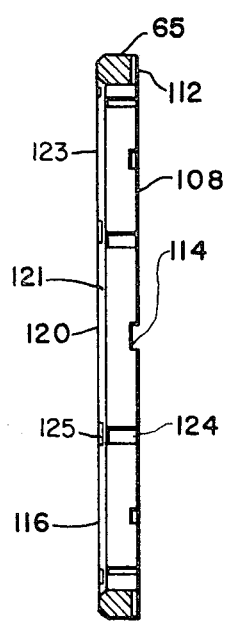
FIG. 3 is a sectional view of the bearing member taken on line 3—3 of FIG. 2.
Figure 2:
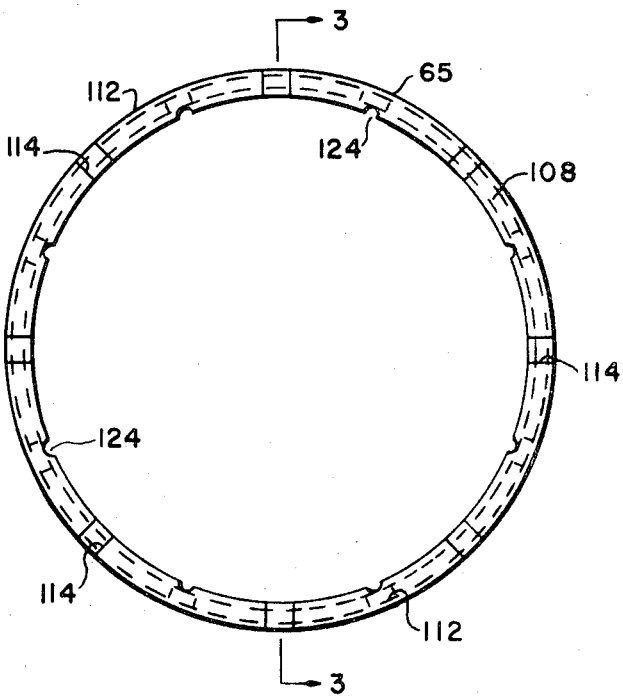
FIG. 2 is a front elevational view of the bearing member illustrated in FIG. 1.
Figure 4:
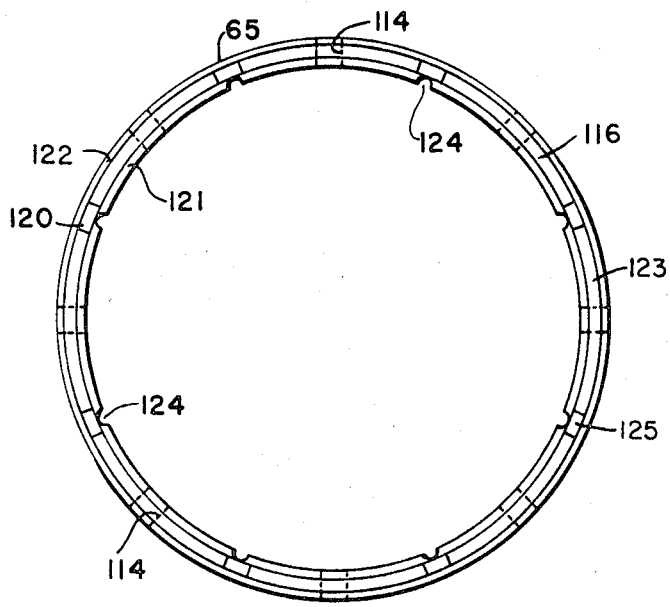
FIG. 4 is a rear elevational view of the bearing member illustrated in FIG. 1.

Referring now to FIGS. 2, 3, and 4, the construction of the two opposite faces of the bearing member 65 is clearly shown. FIG. 2 illustrates the righthand face 108 of the member 65 shown in FIGS. 1 and 3, that is, the the surface which abuts against the cylinder block face 40 along an annular bearing surface 110 preferable located near the periphery of the barrel and circumscribing the cylinder ports 37. It will be seen that this face 108 is provided with a plurality of bearing pads 112 separated by radial grooves 114. FIG. 4 illustrates the lefthand face 116 of the member 65 shown in FIGS. 1 and 3, that is the surface which abuts against an annular bearing surface 118 formed on the supporting plate 14, and which circumscribes the valve plate 42. The face 116 comprises an annular surface 120 having a plurality of bearing pads 123 separated by radial grooves 125 and having sloping sides 121 and 122 extending downwardly to the inner and outer periphery, respectively, of the bearing member 65. The annular surface 120 may optionally be comprised of an uninterrupted annular surface having sloping sides 121 and 122 extending downwardly to the inner and outer periphery of the bearing member.

The opposite faces 108 and 116 of the member 65 are in fluid communication by means of a plurality of axial grooves located on the inner periphery of the member 65 and are indicated generally by the number 124. The bearing pads 112 and 123 are generally referred to as "Kingsbury Pads" and function in a manner well-known in the art.

The bearing member 65 is positioned around the valve plate 42 between the annular bearing surface 110 of the cylinder barrel 32 and the annular bearing surace 118 formed on the supporting plate 14, and is adapted for independent rotation relative to both the cylinder barrel bearing surface 110 and the supporting plate bearing surface 118.

As aforementioned, the cylinder barrel bearing surface 110 abuts the bearing member 65 and is supported thereby while the cylinder barrel face 40 does not make contact with the valve plate face 45. A running clearance between the cylinder barrel face 40 and the valve plate face 45 is maintained by the difference in width between the bearing member 65 and the valve plate 42, with the bearing member being slightly wider. A clearance of .0005 inch between the valve plate and the cylinder block should be sufficient, however, the amount of clearance will vary depending upon the leakage requirement necessary for the particular speed, temperature, pressure, and fluid at which the device will be operated.

It will be seen that leakage flowing radially outward from the cylinder ports 37 is carried across between the cylinder barrel and valve plate faces and into radial grooves 114 for the purpose of lubricating the bearing pads 112 of the righthand face 108 of the bearing member. Leakage drawing radially outward from the supporting plate ports 51 and 52 is carried across between the valve plate and supporting plate faces and onto the bearing surface 120 for lubricating the same. Leakage from both surfaces of the member 65 flow past the outer periphery of the member 65 and into the chamber 30.

In operation, the device functions as a pump in the manner well-known to the art. As herebefore mentioned, the bearing member 65 is capable of spinning independent of the rotating cylinder block, the valve plate, and the supporting plate. The peripheral velocity of the member will depend upon the friction and viscous drag between it, the cylinder barrel bearing surface 110 and the supporting bearing surface 118; hence, the relative velocity of the bearing member will be at some intermediate value of cylinder barrel speed.

Any tendency for seizure or scoring of one set of bearing surfaces will reduce their relative motion and at the same time increase the relative velocity between the other set of bearing surfaces to compensate. The reduced relative velocity between the two sets of surfaces will cause less of a temperature build-up resulting in a corresponding reduction in surface wear and galling between the cylinder barrel and supporting plate faces.

It will thus be seen that the present invention provides a rugged, compact, and low cost construction for use in a fluid pressure energy translating device and in which its construction allows devices embodying the invention to operate at much higher speeds than conventional devices of the type herebefore mentioned, yet minimizing excessive wear and galling while providing utmost efficiency, reliability, and long life.

While the form of embodiment of the invention as herein disclosed constitutes a preferred form, it is to be understood that other forms might be adapted, all coming within the scope of the claims which follow.

What is claimed is as follows:

1. In a fluid pressure energy translating device including a rotatable cylinder barrel, said barrel having a plurality of pistons with inner ends disposed for reciprocation within cylinders in said barrel;

cylinder ports communicating each of said cylinders with one end of said barrel;

a first annular bearing surface circumscribing said cylinder ports;

a valve construction comprising a supporting plate having arcuate fluid passages;

a valve plate disposed between said supporting plate and said cylinder barrel and having arcuate passages therethrough and adapted to register with said passages in the supporting plate, said valve plate being disposed for relative rotary movement with said cylinder barrel with said cylinder ports communicating successively with said valve plate arcuate passages;

means for preventing rotation of said plates;

a second annular bearing surface on said supporting plate, said bearing surface circumscribing said valve plate; and means forming an annular bearing member, the opposite sides thereof being in slidable abutment respectively with said first and said second bearing surfaces and adapted for rotary motion relative to said first and second bearing surfaces, said member circumscribing said valve plate and having a width greater than said valve plate for separating said cylinder block ports and said valve plate arcuate passages by a predetermined amount.

2. A combination as in claim 1 wherein said annular bearing member comprises a ring having a plurality of bearing pads separated by radial grooves, said pads and grooves being positioned on the face of said ring which abut said first bearing surface.

3. A combination as in claim 2 wherein said second bearing surface is diametrically opposed to said first bearing surface.

4. A combination as in claim 1 wherein said annular bearing member comprises a ring having a plurality of bearing pads separated by radial grooves, said pads and grooves being positioned on both faces of said ring and adapted to abut said first and second bearing surfaces.

5. A combination as in claim 1 wherein said annular bearing member comprises a ring having a plurality of bearing pads separated by radial grooves, said pads and grooves being positioned on the face of said ring which abuts said second bearing surface.

6. A combination as in claim 1 wherein said annular bearing member comprises a ring having a plurality of bearing pads separated by radial grooves said pads and grooves being positioned on one face of said ring.

7. A fluid pressure energy translating device including a housing having a cylinder barrel, a plurality of pistons with inner ends disposed for reciprocation with cylinders in said barrel and with outer end protruding from one end of said barrel, an inclined cam plate facing said outer piston ends, a bearing surface on said cam plate, the ends of said pistons having bearing means being adapted to slidably follow said bearing surface, cylinder ports communicating each of said cylinders with the other end of said cylinder barrel, a valve construction comprising a supporting plate having arcuate fluid passages therein, a valve plate disposed between said supporting plate and said cylinder barrel and having arcuate passage therethrough and adapted to register with the said passages in the supporting plate, said valve plate being disposed for relative rotary movement with said cylinder barrel with the said cylinder ports communicating successively with said valve plate arcuate passages and means preventing relative rotation of said plates, the improvement which comprises a first annular bearing surface on said cylinder barrel circumscribing said cylinder ports, a second annular bearing surface on said supporting plate circumscribing said valve plate and means forming an annular bearing member being disposed between said first and second bearing surface and adapted for rotary motion relative to said first and second bearing surfaces.

8. A combination as in claim 7 wherein said annular bearing member circumscribes said valve plate and has a width greater than said valve plate for separating said cylinder block ports and said valve plate arcuate passages by a predetermined amount.

9. A combination as in claim 8 wherein said annular bearing member comprises a ring having a plurality of bearing pads separated by radial grooves, said pads and grooves being positioned on the face of said ring which abuts said first bearing surface.

10. A combination as in claim 8 wherein said annular bearing member comprises a ring having a plurality of bearing pads separated by radial grooves, said pads and grooves being positioned on one face of said ring.

References Cited

UNITED STATES PATENTS

| 1,722,832 | 7/1929 | West. | |
| 2,990,784 | 7/1961 | Wahlmark | 103—162 |

FOREIGN PATENTS

| 204,712 | 2/1955 | Australia. |

ROBERT M. WALKER, Primary Examiner